United States Patent
Kunz

Patent Number: 5,183,713
Date of Patent: Feb. 2, 1993

[54] CARBON MONOXIDE TOLERANT PLATINUM-TANTALUM ALLOYED CATALYST

[75] Inventor: Harold R. Kunz, Vernon, Conn.

[73] Assignee: International Fuel Cells Corporation, South Windsor, Conn.

[21] Appl. No.: 642,629

[22] Filed: Jan. 17, 1991

[51] Int. Cl.$^5$ .............................................. H01M 4/92
[52] U.S. Cl. ...................... 429/44; 502/185; 502/339
[58] Field of Search .................... 429/44; 502/339, 185

[56] References Cited

U.S. PATENT DOCUMENTS

| | | | |
|---|---|---|---|
| 3,274,031 | 9/1966 | Maget et al. | 429/44 X |
| 3,424,619 | 1/1969 | Adlhart et al. | 502/339 X |
| 3,762,957 | 10/1973 | Breault et al. | 136/121 |
| 3,765,947 | 10/1973 | Felten et al. | 136/120 FC |
| 4,044,193 | 8/1977 | Petrow et al. | 429/40 |
| 4,186,110 | 1/1980 | Jalan et al. | 252/447 |
| 4,373,014 | 2/1983 | Landsman et al. | 429/44 X |

OTHER PUBLICATIONS

CO Adsorption on PT(111) Doped with TIO, FEO, ZNO, and FE, and PT AD-Atoms. Molecular Orbital Study of CO Dopant Interactions, A. B. Anderson and D. Q. Dowd, J. Phys. Chem 1987, 91, 869–873.
Catalytic Effects of HG and TI Submonolayers on the Electrooxidation of Formic Acid on PT, Th. Hartung, J. Willsau and J. Heitbaum, J. Electroanal. Chem., 205 (1986) 135–149.
Engelhard, WPI Abstract No. 74-48728V, 1974.

*Primary Examiner*—Stephen Kalafut
*Attorney, Agent, or Firm*—Panela J. Curbelo

[57] ABSTRACT

Carbon monoxide poisoning of anode catalysts in phosphoric acid fuel cells reduces the cell performance. The carbon monoxide absorbs onto the catalyst, blocking hydrogen oxidation sites. A carbon monoxide tolerant platinum-tantalum alloyed catalyst includes between about 2 wt % and about 50 wt % platinum, between about 2 atom % and 10 atom % tantalum deposited on a support. This catalyst is particularly useful in fuel cell system applications where the fuel stream may contain carbon monoxide.

10 Claims, 4 Drawing Sheets

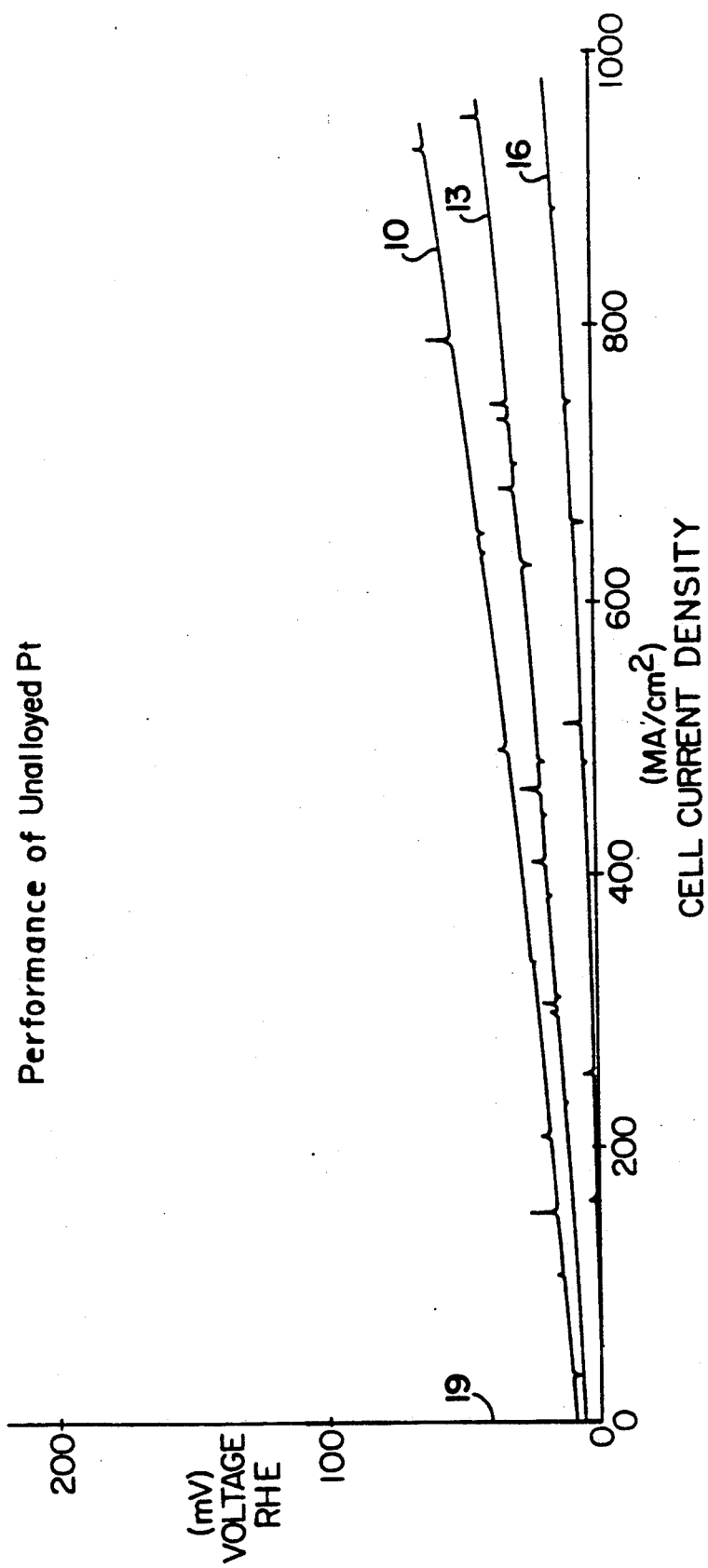

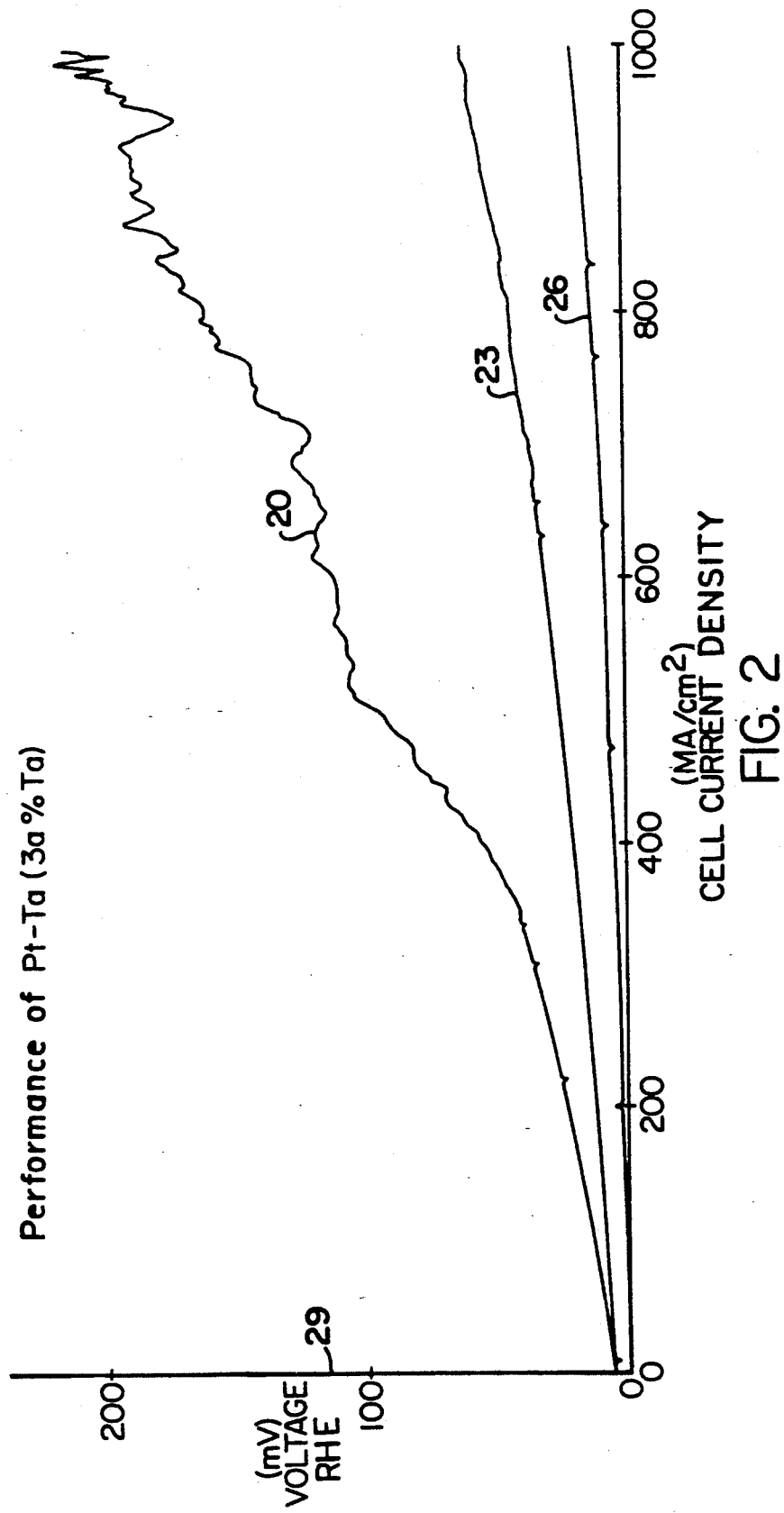

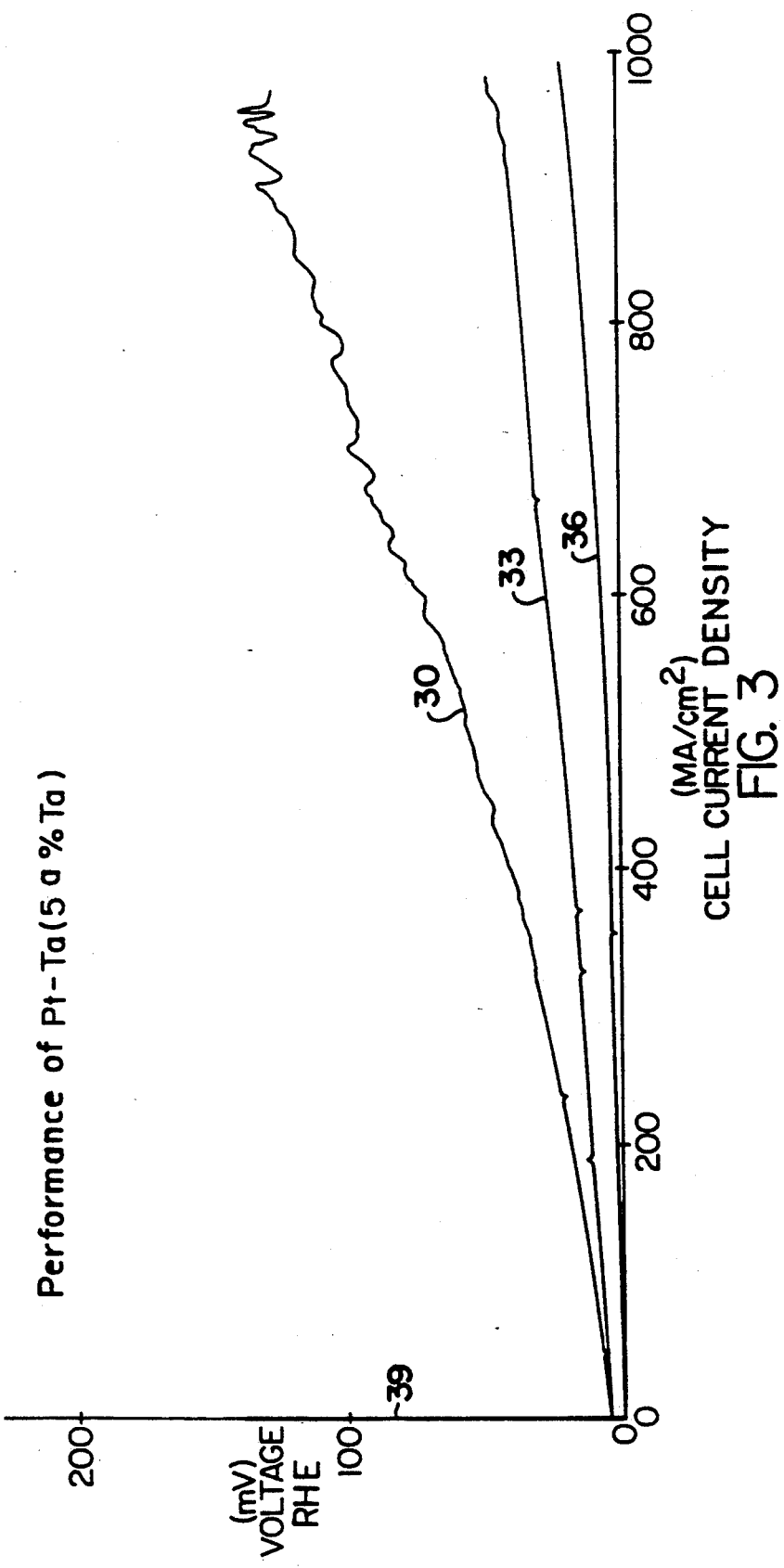

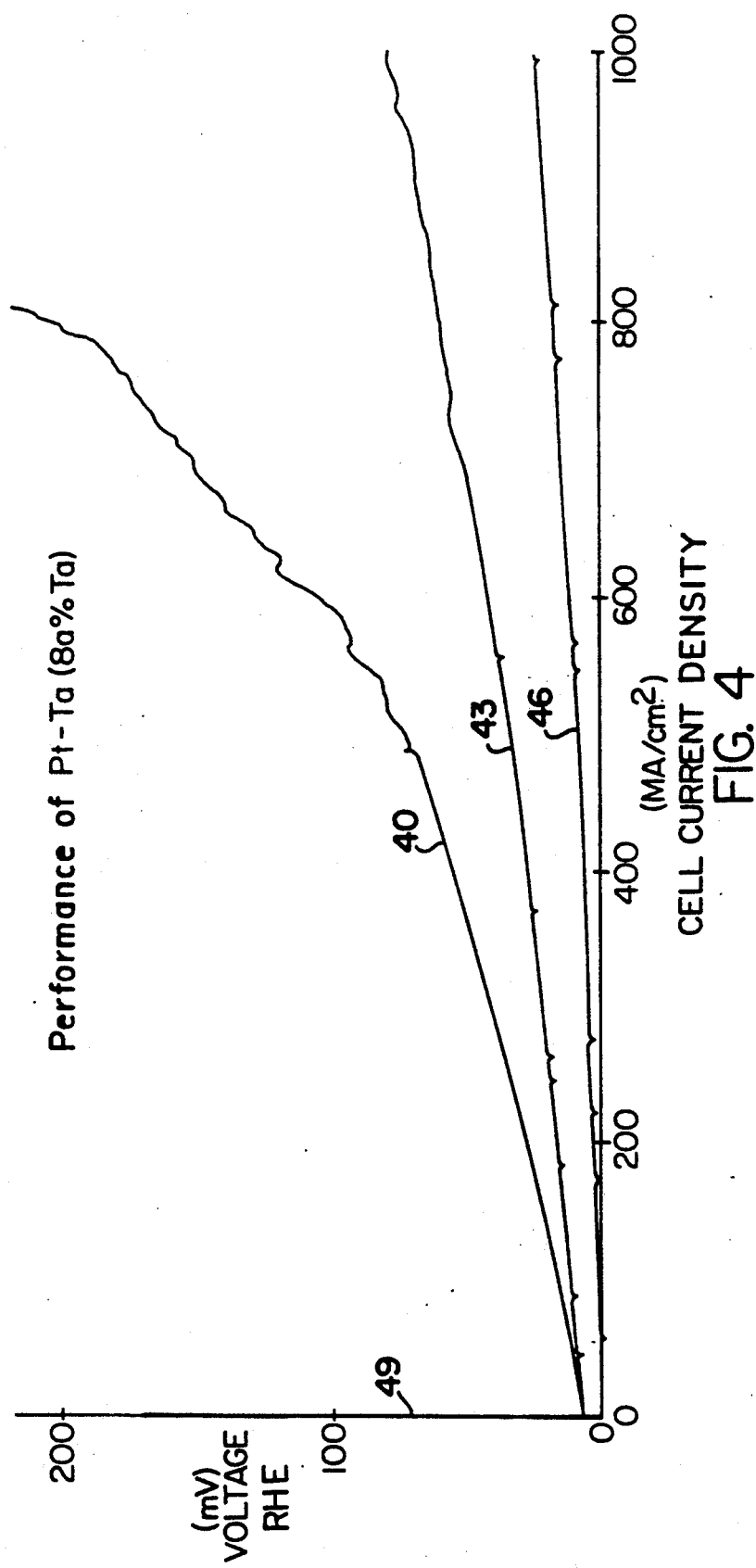

CARBON MONOXIDE TOLERANT PLATINUM-TANTALUM ALLOYED CATALYST

TECHNICAL FIELD

The present invention relates to a catalyst, and especially to a carbon monoxide tolerant catalyst.

BACKGROUND ART

Fuel cell stacks are typically employed in the production of electricity. These fuel cell stacks typically consist of a plurality of fuel cells connected in series through an electrical load. Each fuel cell has a cathode with a cathode catalyst and an anode with an anode catalyst, with an electrolyte disposed therebetween, a cathode chamber, and an anode chamber. Within the fuel cell, a fuel, such as hydrogen, and an oxidant, such as oxygen, react to form electricity.

In a phosphoric acid fuel cell, for example, hydrogen reacts with oxygen to form water, heat, and electricity. At temperatures between about 300° F. and 500° F. and pressures ranging from about 1 to 8 atmospheres, hydrogen reacts on the anode catalyst to produce protons and free electrons. The free electrons pass through an external load and the protons pass through the electrolyte to the cathode where they react on the cathode catalyst with oxygen to form water.

The anode and cathode catalysts are typically composed of platinum (Pt) supported on carbon. The anode catalyst ionizes hydrogen to form protons and free electrons, while the cathode catalyst assists in the reduction of oxygen to form water. These catalysts, especially the anode catalyst, can easily be poisoned by carbon monoxide which often contaminates the fuel stream. The carbon monoxide adsorbs on the surface of the catalyst, blocking hydrogen oxidation sites thereby inhibiting efficient oxidation of the hydrogen and causing performance loss.

Typically, a shift converter is used to reduce the carbon monoxide content of the fuel stream, and hence reduce the degree of carbon monoxide poisoning. The shift converter converts the carbon monoxide to carbon dioxide and hydrogen via a reaction with water, thereby reducing the carbon monoxide content of the fuel stream. However, although the shift converter is effective, as with any piece of equipment, there are costs associated with its use and maintenance. Elimination of the shift converter would simplify fuel processing and reduce the cost, volume, and weight of the overall fuel cell system.

What is needed in the art is a carbon monoxide tolerant catalyst that can decrease or eliminate the need for a shift converter in fuel cell systems, thereby reducing cost and simplifying the fuel processing.

DISCLOSURE OF INVENTION

The present invention relates to a carbon monoxide tolerant platinum-tantalum alloyed supported catalyst. The catalyst is comprised of about 2 wt % to about 50 wt% platinum with about 2 atom % (a %) to about 10 atom % tantalum deposited on a support.

The present invention also relates to a fuel cell whereby the fuel cell has a platinum-tantalum alloyed supported catalyst which is carbon monoxide tolerant.

The present invention further relates to a method of preparing a carbon monoxide tolerant platinum-tantalum alloyed supported catalyst.

The foregoing and other features and advantages of the present invention will become more apparent from the following description and accompanying drawings.

BRIEF DESCRIPTION OF DRAWINGS

FIG. 1 is a graph of the unalloyed Pt polarization experimentation results.

FIG. 2 is a graph of the Pt—Ta (3 a% Ta) polarization experimentation results.

FIG. 3 is a graph of the Pt—Ta (5 a% Ta) polarization experimentation results.

FIG. 4 is a graph of the Pt—Ta (8 a% Ta) polarization experimentation results.

BEST MODE FOR CARRYING OUT THE INVENTION

While the invention will be described in connection with a phosphoric acid fuel cell, the invention is by no means limited thereto. The platinum-tantalum alloyed catalyst may be employed with any fuel cell or similar system in which a carbon monoxide tolerant catalyst would be useful, such as liquid fluorosulfonic and fluorophosphonic acids and solid polymeric electrolytes. One such solid polymeric electrolyte is Nafion ® produced by E.I. du Pont de Nemours & Co. (Inc.), Wilmington, DE.

The present invention relates to a platinum-tantalum alloyed supported catalyst which is carbon monoxide tolerant. The catalyst, which comprises platinum and tantalum deposited on a support, is typically located on the anode side of an electrolyte in a fuel cell.

During preparation of the alloyed catalyst, the platinum can be in various alloyable forms conventionally known in the art. Two such forms include supported platinum, such as pure metallic platinum on carbon, and platinum salt, such as platinum chloride or chloroplatinic acid, which is deposited on a support. If the platinum is in the form of a salt, any conventional manner of deposition can be employed. Platinum particle size preferably ranges from about 20 angstroms and about 100 angstroms. Platinum particles larger than about 100 angstroms typically have reduced catalytic activity due to low surface area, while particles less than about 20 angstroms lose surface area rapidly with time due to poor structural integrity.

Between about 2 wt % and about 50 wt % platinum can be utilized; wherein the wt % refers to the weight of the platinum versus the total combined weight of the support and platinum. Preferably, the wt % the platinum ranges from about 3 wt % to about 10 wt %, with between about 4 wt % and about 7 wt % especially preferred due to the final thickness of the alloyed catalyst on the electrolyte. This range, between about 4 wt % and about 7 wt %, allows catalyst layers of suitable thickness to be fabricated.

To attain a desired platinum loading on the electrode, the required amount of catalyst (platinum and support) is varied according to the wt % platinum in the catalyst. As the platinum wt % decreases, the amount of support, inactive material, increases in order to attain the desired platinum loading. Consequently, low weight percentages of platinum result in a thick layer (often greater than 0.2mm) of catalyst on the electrolyte. Thick layers of catalyst restrict reactant diffusion, decreasing the fuel cell efficiency. Meanwhile, higher platinum weight percentages (generally greater than 7 wt %) result in thin layers (typically less than 0.05mm) which can not be uniformly fabricated.

The platinum is alloyed with tantalum. The percentage of tantalum versus platinum can range from about 2 atom % to about 10 atom %, with between about 5 atom % and about 8 atom % preferred. The tantalum, at percentages above about 8 atom %, covers part of the platinum surface thereby interfering with fuel reaction sites, while at percentages below about 2 atom % it causes a decrease in the carbon monoxide tolerance to unacceptable levels.

Prior to alloying, the platinum and tantalum are deposited essentially uniformly on a support. Any support conventionally known in the art which is electrically conductive, stable in the electrolyte, and has a high surface area to support the catalyst, can be used. This support should be porous and, if the electrolyte is a liquid electrolyte, capable of being wetted by the electrolyte, to enhance intimate contact between the catalyst and the electrolyte thereby improving or optimizing proton transfer. Although supports with surface areas as low as about 20 $m^2/g$ can be used, supports with surface areas between about 70 $m^2/g$ and about 1000 $m^2/g$ are preferred. Typical supports include carbon based supports such as Vulcan ® XC-72 and Black Pearls 2000 produced by Cabot Corp., Billerica, Massachusetts, Conductex SC produced by Cities Service, Alwon, Ohio, Darco G60SP produced by Dexter, Windsor, CT, acetylene black produced by Shawinigan, Ontario, Canada, charcoal, metal oxide and carbide supports, and mixtures thereof. Additionally, blends of supports can be used to provide high surface area for the catalyst and good electronic conductivity.

Preparation of this platinum-tantalum alloyed catalyst can be accomplished via any conventional catalyst preparation technique. One such conventional technique consists of dispersing a supported unalloyed platinum catalyst in a solvent, forming a slurry. A tantalum solution is then prepared by dissolving tantalum, typically in the form of a salt, in the same or a different solvent. The platinum slurry and tantalum solution are mixed until essentially homogenous to ensure an even dispersion of tantalum on the supported platinum. The pH of the mixture may then be adjusted to cause the tantalum to precipitate onto the supported platinum, typically as an oxide or hydroxide, or the solvent can be removed via boiling to deposit the tantalum onto supported platinum. The catalyst is then dried, sieved, heat treated, such as for approximately 1 hour at 1700° F. in an inert atmosphere, and cooled.

Another conventional technique consists of dispersing a support in a solvent. A platinum solution, such as platinum salt in the same or a different solvent, is prepared and mixed into the dispersion. Temperature and pH are adjusted. A reactant may be necessary to precipitate the platinum onto the support. A tantalum solution, prepared similarly to platinum solution, is prepared and added to the dispersion. The tantalum is precipitated, also depositing on the support. The support with the platinum and tantalum is then dried, sieved, heat treated, and cooled.

The solvent employed in the catalyst preparation process, typically water, can be any solvent which does not degrade or react with the platinum, support, or tantalum. The tantalum can be in any form which can be dissolved and precipitated without adversely effecting the platinum or the support. Some possible forms of tantalum include salts, such as tantalum chloride, tantalum fluoride, and acid, such as tantalic acid. Note, the solvent in which the tantalum salts are typically dissolved are alcohols such as isopropanol, acids such as nitric acid, potassium hydroxide solution, and water. The platinum can either be deposited, unalloyed on the support, or in a form which can be dissolved in a solvent and precipitated onto the support, such as a platinum salt.

The invention will be clarified by reference to the following illustrative examples. The examples are given to illustrate a method for preparing the platinum-tantalum supported catalyst of the present invention. They are not, however, intended to limit the generally broad scope of the present invention.

EXAMPLE I

The following procedure was used to prepare the Pt/Ta catalyst of the present invention.
1. 5.0 g of 5.0% Pt/Vulcan catalyst was sieved through an 80 mesh screen to break up the catalyst particles.
2. The catalyst was then ultrasonically blended for 2.0 minutes with 75.0 ml of water, forming a slurry.
3. 0.073 g of tantalum chloride was dissolved in 30 ml of isopropanol and added to the slurry.
4. The slurry was stirred for 25 minutes after the pH was adjusted to 5.5 with ammonium hydroxide to cause the tantalum to precipitate.
5. The slurry was dried overnight (approximately 16 hours) at 150° F.
6. The dried slurry was sieved through an 80 mesh screen, heat treated for 1 hour at 1700° F. in a nitrogen atmosphere, and rapidly cooled.

EXAMPLE II

The following procedure, the filter transfer technique, was used to form a gas diffusion electrode with the Pt/Ta catalyst from Example I for performance testing.
1. 120 mg Pt/Ta catalyst was ultrasonically blended in 80 ml of water for 30 sec. to break up the particles.
2. 1.0 ml of aluminum nitrate was then added to the slurry.
3. The pH of the slurry was adjusted to 4.0 via the addition of ammonium hydroxide.
4. The slurry was then ultrasonically blended with a dispersion containing 120 mg (50 wt %) of Teflon (TFE-30) for 30 sec. Teflon is a tetrafluoroethylene fluorocarbon polymer, produced by Du Pont de Nemours, E. I. & Co., Wilmington, DE.
5. The catalyst-Teflon mixture was allowed to separate from the liquid.
6. The catalyst-Teflon mixture was then filtered out of the liquid, transferred to a previously wetproofed porous carbon substrate produced by Dexter, Windsor, CT, and rolled and dried under a heat lamp and water aspirator.
7. The electrode was then sintered at 640° F. to 660° F. for 15 minutes in air to attain the desired degree of catalyst layer wetproofing.

The gas diffusion electrodes of Example II were tested in two manners: anode polarization evaluations and cathode performance evaluations. Both of these tests were performed at a cell temperature of approximately 350° F., 1 atm. pressure, using gases with a 115° F. dew point and in a 100% phosphoric acid electrolyte. The test samples for anode polarization experiments were sintered at 640° F. for 15 minutes, while the test samples for the cathode performance evaluations were sintered at 660° F. for 15 minutes.

In the anode polarization experiments, a 1.0 cm² sample floated on the surface of the electrolyte with a Piontelli-type hydrogen reference electrode; an electrode in which the hole in the reference electrode chamber is on the inner surface of a cylinder which supports the working electrode. The current was increased from 0 mA to 1000 mA at 400 mA/min., and the iR-free potential measured under a simulated steam-reformed hydrocarbon mixture (RL-1) (70% hydrogen, 29% carbon dioxide, 1% carbon monoxide), a high carbon monoxide fuel (78% hydrogen, 10% carbon dioxide, 10% carbon monoxide, 2% methane), hydrogen, and methane.

The results of the polarization tests can be seen in Table I and FIGS. 1–4. In FIG. 1, lines 10 and 13 correspond to the the high carbon monoxide fuel and RL-1, respectively, while lines 16 and 19 correspond to hydrogen and methane respectively. In FIG. 2, lines 20 and 23 correspond to the high carbon monoxide fuel and RL-1, respectively, while lines 26 and 29 correspond to hydrogen and methane, respectively. In FIG. 3, lines 30 and 33 correspond to the high carbon monoxide fuel and RL-1 respectively, while lines 36 and 39 correspond to hydrogen and methane respectively. In FIG. 4, lines 40 and 43 correspond to the high carbon monoxide fuel and RL-1, respectively, while lines 46 and 49 correspond to hydrogen and methane respectively.

TABLE I

CATALYST OPTIMIZATION

| Catalyst | Polarization Under RL-1 at 1000 mA/cm² | Polarization Under High CO Fuel at 400 mA/cm² | Catalyst Surface Area m²/g |
|---|---|---|---|
| Pt (unalloyed) | 43 | 28 | 110 |
| Pt—Ta (3% Ta)* | 60 | 53 | 82 |
| Pt—Ta (5% Ta)* | 50 | 125 | — |
| Pt—Ta (8% Ta)* | 79 | 55 | 27 |

*% is atomic %

Although the polarization of all the platinum-tantalum alloy anodes are higher than that of the unalloyed platinum, the 8 atom % alloy results in a polarization only about twice that of the pure platinum while having only about one quarter of the surface area. The effective catalyst activity per unit area is therefore almost twice that of platinum alone.

Generally, the alloyed catalyst of the present invention will be employed in a fuel cell as an anode catalyst. In the fuel cell, a carbon monoxide contaminated hydrogen stream will be introduced to the anode chamber and to the platinum-tantalum alloyed supported catalyst without previous processing for carbon monoxide removal. Unlike the prior art platinum catalyst which is used in fuel cells, the catalyst of the present invention is less poisoned by carbon monoxide since it reduces the adsorption of carbon monoxide. The reduction in carbon monoxide poisoning leaves more reaction sites free for hydrogen oxidation. As a result, the current per unit of catalyst surface area is increased. For example, the current at a 44 mV anode polarization with 10% carbon monoxide in the fuel gas is increased from about $7.1 \times 10^{-3}$ amps/cm² for pure platinum catalyst to about $1.4 \times 10^{-2}$ amps/cm² for platinum-tantalum alloyed catalyst; approximately a factor of two.

Typically, only less than 1 mole% carbon monoxide can enter a fuel cell without excessively poisoning the catalyst. With the catalyst of the present invention carbon monoxide levels up to at least about 2 mole % are acceptable.

Although this invention has been shown and described with respect to detailed embodiments thereof, it will be understood by those skilled in the art that various changes in form and detail thereof may be made without departing from the spirit and scope of the claimed invention.

I claim:

1. A binary alloyed catalyst, which comprises:
   a. between about 2 wt % and 50 wt % platinum;
   b. between about 2 atom% and 10 atom % tantalum with the platinum; and
   c. a support.

2. A binary alloyed catalyst as in claim 1, wherein said platinum has a particle size between about 20 angstroms and about 100 angstroms.

3. A binary alloyed catalyst as in claim 1 wherein said support is selected from the group consisting of carbon based supports, metal carbide and oxide supports, and mixtures thereof.

4. A fuel cell, said fuel cell comprised of a cathode with a cathode catalyst, an anode, and a phosphoric acid electrolyte disposed therebetween, a cathode chamber on the nonelectrolyte side of the cathode, an anode chamber on the nonelectrolyte side of the anode, wherein the improvement comprises a binary platinum-tantalum alloyed anode catalyst which comprises about 2 wt % to about 50 wt % platinum to support, and about 2 atom % to about 10 atom % tantalum with said platinum, on an electrically conductive support.

5. A fuel cell as in claim 4 wherein said support is selected from the group consisting of carbon based supports, metal carbide and oxide supports, and mixtures thereof.

6. A fuel cell as in claim 4 wherein said platinum has a particle size between about 20 angstroms and about 100 angstroms.

7. A fuel cell as in claim 4 wherein said fuel cell is a phosphoric acid fuel cell.

8. A fuel cell stack, said fuel cell stack having fuel, an oxidant, carbon monoxide, and a plurality of fuel cells, each fuel cell comprised of a cathode with a cathode catalyst, an anode, and a phosphoric acid electrolyte therebetween, a cathode chamber on the nonelectrolyte side of the cathode, an anode chamber on the nonelectrolyte side of the anode, wherein the improvement comprises a binary platinum-tantalum alloyed anode catalyst which comprises about 2 wt % to about 50 wt % platinum on a support, about 2 atom % and about 10 atom % tantalum, on an electrically conductive support.

9. A fuel cell stack as in claim 8 wherein said support is selected from the group consisting of carbon based supports, metal carbide and oxide supports, and mixtures thereof.

10. A fuel cell stack as in claim 8 wherein said platinum has a particle size between about 20 angstroms and about 100 angstroms.

* * * * *